US011983945B2

(12) United States Patent
Cirimele et al.

(10) Patent No.: US 11,983,945 B2
(45) Date of Patent: *May 14, 2024

(54) INTERACTIVE EDITING OF ELECTRONIC TEXT

(71) Applicant: Google LLC, Mountain View, CA (US)

(72) Inventors: Maria Cirimele, East Palo Alto, CA (US); Thomas William Buckley, San Francisco, CA (US); Robert Ky Mickle, Cambridge, MA (US); Tayeb Al Karim, Somerville, MA (US)

(73) Assignee: Google LLC, Mountain View, CA (US)

( * ) Notice: Subject to any disclaimer, the term of this patent is extended or adjusted under 35 U.S.C. 154(b) by 498 days.

This patent is subject to a terminal disclaimer.

(21) Appl. No.: 17/327,034

(22) Filed: May 21, 2021

(65) Prior Publication Data

US 2021/0279458 A1    Sep. 9, 2021

Related U.S. Application Data

(63) Continuation of application No. PCT/US2019/051333, filed on Sep. 16, 2019, which
(Continued)

(51) Int. Cl.
*G06V 30/32* (2022.01)
*G06F 3/0354* (2013.01)
(Continued)

(52) U.S. Cl.
CPC .......... *G06V 30/32* (2022.01); *G06F 3/03545* (2013.01); *G06F 40/171* (2020.01);
(Continued)

(58) Field of Classification Search
CPC .... G06V 30/32; G06V 30/153; G06V 30/347; G06V 30/36; G06F 3/03545; G06F 40/171
(Continued)

(56) References Cited

U.S. PATENT DOCUMENTS 6,754,386 B1 *  6/2004  Williamson ....... G06V 30/2268
                                                382/229
10,664,658 B2 *  5/2020  Mannby ................ G06F 40/274
(Continued)

OTHER PUBLICATIONS

Response to Communication pursuant to Article 94(3) EPC dated Jan. 31, 2023, from counterpart European Application No. 19779313.6 filed Jun. 6, 2023, 18 pp.
(Continued)

*Primary Examiner* — Charlotte M Baker
(74) *Attorney, Agent, or Firm* — Shumaker & Sieffert, P.A.

(57) ABSTRACT

A new segment of electronic handwriting is provided to a handwriting recognition module to obtain a plurality of textual interpretations of the new segment. The textual interpretations obtained from the handwriting recognition module are scored based on how each respective electronic handwriting representation would change a display of existing electronic content when the respective electronic handwriting representation is displayed substantially at the user designated position within or adjacent to the existing electronic content. Based on the scoring, an electronic handwriting representation corresponding to a respective textual interpretation of the plurality of textual interpretations is selected, and the existing electronic content is modified to include the selected electronic handwriting representation located substantially at the user designated position.

20 Claims, 6 Drawing Sheets

Related U.S. Application Data is a continuation of application No. 16/273,014, filed on Feb. 11, 2019, now Pat. No. 10,769,424.

(51) Int. Cl.
  *G06F 40/171* (2020.01)
  *G06V 30/148* (2022.01)

(52) U.S. Cl.
  CPC .......... *G06V 30/153* (2022.01); *G06V 30/347* (2022.01); *G06V 30/36* (2022.01)

(58) Field of Classification Search
  USPC ........................................................ 382/187
  See application file for complete search history.

(56) References Cited

U.S. PATENT DOCUMENTS

| | | |
|---|---|---|
| 10,769,424 B2 | 9/2020 | Cirimele et al. |
| 2014/0363083 A1 | 12/2014 | Xia et al. |
| 2017/0249505 A1 | 8/2017 | Couelier et al. |
| 2018/0052813 A1* | 2/2018 | Laupretre ............. G06F 40/171 |
| 2018/0107650 A1 | 4/2018 | Calvo et al. |
| 2019/0026019 A1 | 1/2019 | Guiavarc'h et al. |

OTHER PUBLICATIONS

Communication pursuant to Article 94(3) EPC from counterpart European Application No. 19779313.6 dated Jan. 31, 2023, 7 pp.

International Search Report and Written Opinion from PCT/US2019/051333, dated Nov. 13, 2019, 13 pages.

Notice of Allowance from U.S. Appl. No. 16/273,014, dated Jun. 30, 2020, 11 pp.

Response to Communication Pursuant to Rules 161(1) and 162 EPC dated Jun. 25, 2021, from counterpart European Application No. 19779313.6, filed Nov. 23, 2021, 25 pp.

International Preliminary Report on Patentability from International Application No. PCT/US2019/051333, dated Aug. 26, 2021, 8 pp.

\* cited by examiner

INTERACTIVE EDITING OF ELECTRONIC TEXT

RELATED APPLICATION

This application is a continuation of International Application No. PCT/US2019/051333, filed Sep. 19, 2019 which claims benefit of U.S. application Ser. No. 16/273,014, filed Feb. 11, 2019, the entire contents of each of which are hereby incorporated by reference.

BACKGROUND

The editing of existing electronic documents is traditionally done by way of a traditional keyboard and mouse input. For example, a user may select a portion of the document to be edited and provide input via the keyboard to erase, add to, or modify content within the document. Certain software applications allow use of a stylus to add handwritten notes to documents. However, in these applications, electronic handwriting applied to a document is generally static. Either the input is permanently displayed as electronic handwriting, or the electronic handwriting is converted in its entirety to character-based content. If a mistake is made, the user must undo the last action and redraw the notes in the document. In other words, editing of a document is accomplished after the entire document is converted to computer-based text form, and all of the user-generated content is ultimately displayed in text form.

SUMMARY

Aspects of the subject technology provide systems and methods for providing interactive editing of electronic text using electronic handwriting. A goal of the electronic handwriting is to encourage creativity and freeform mixed layouts where drawings, figures, and text may be placed anywhere in the document. To that end, the subject technology provide a computer-implemented method that includes receiving a new segment of electronic handwriting for display at a user designated position within or adjacent to existing electronic content displayed on a display device, providing the received new segment to a handwriting recognition module to obtain a plurality of textual interpretations of the new segment, generating respective electronic handwriting representations for the plurality of textual interpretations obtained from the handwriting recognition module, scoring the plurality of textual interpretations obtained from the handwriting recognition module based on how each respective electronic handwriting representation would change the display of the existing electronic content when the respective electronic handwriting representation is displayed substantially at the user designated position within or adjacent to the existing electronic content, selecting, based on the scoring, an electronic handwriting representation corresponding to a respective textual interpretation of the plurality of textual interpretations, and modifying, for display on the display device, the existing electronic content to include the selected electronic handwriting representation located substantially at the user designated position. Other aspects include corresponding systems, apparatuses, and computer program products for implementation of the computer-implemented method.

Further aspects of the subject technology, features, and advantages, as well as the structure and operation of various aspects of the subject technology are described in detail below with reference to accompanying drawings.

BRIEF DESCRIPTION OF THE FIGURES

Aspects of the subject technology are described with reference to the accompanying drawings. In the drawings, like reference numbers may indicate identical or functionally similar elements.

DETAILED DESCRIPTION

Figure 1:
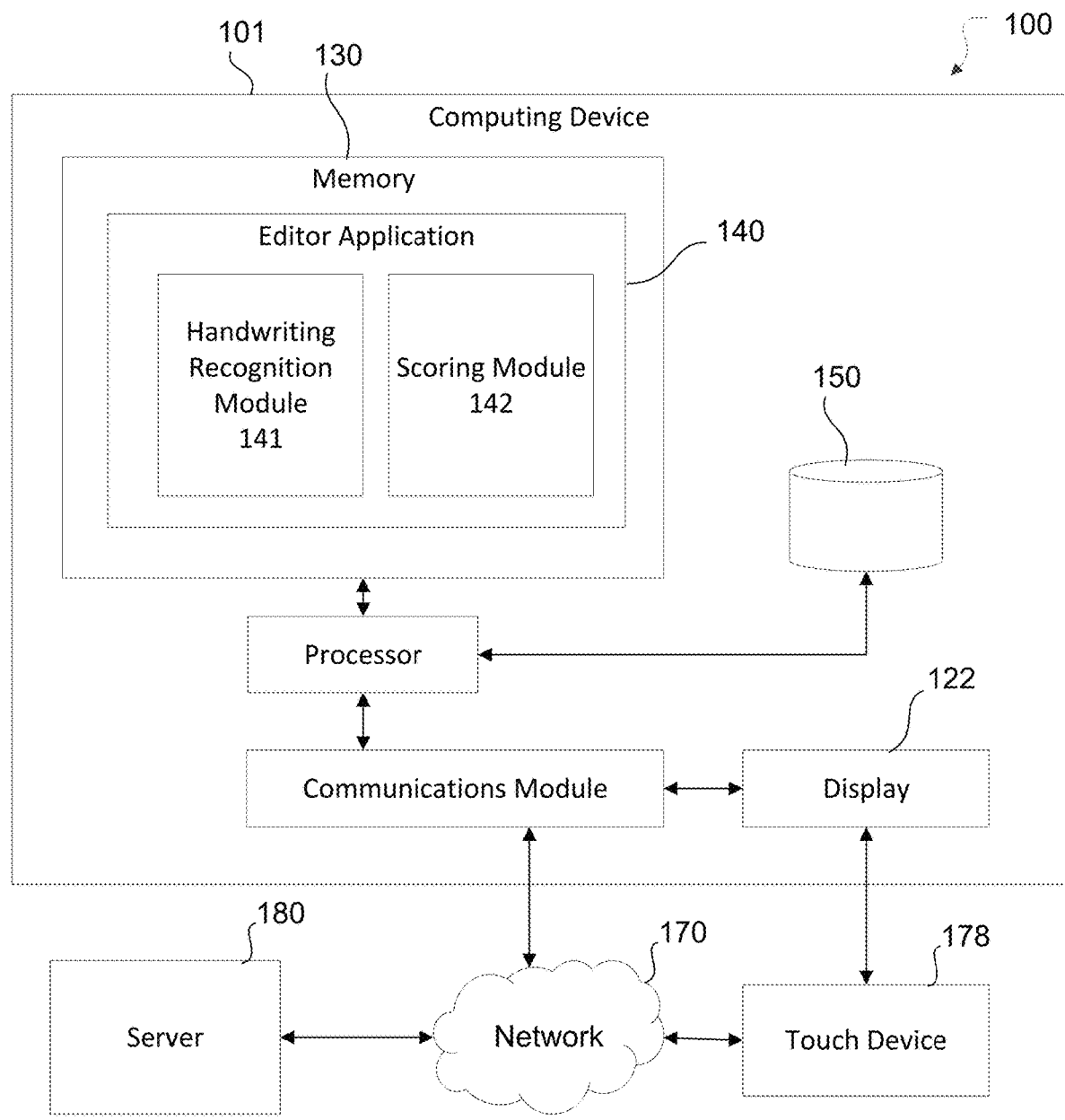
FIG. 1 illustrates an exemplary system for editing electronic text, according to aspects of the subject technology.

While aspects of the subject technology are described herein with reference to illustrative examples for particular applications, it should be understood that the subject technology is not limited to those particular applications. Those skilled in the art with access to the teachings provided herein will recognize additional modifications, applications, and aspects within the scope thereof and additional fields in which the subject technology would be of significant utility.

There is a need to keep user-generated content in handwriting and to allow the interactive editing of the electronic handwriting content. There is also a need to have a user interface that allows interaction between computer-based text and handwriting, all while maintaining a natural flow of a written document.

The subject technology provides a software application in which a user may interact with a structured document that includes existing electronic content made up of a string of electronic characters and/or user-generated electronic handwriting (e.g., one or more lines of text or paragraphs, or drawings or symbols). The electronic content may be broken down as multiple segments or blocks for dynamic editing of the content. Each segment or block may be the smallest definable unit of text, such as a character or word, or may encompass a series of handwriting strokes or one or more continuous strokes. A segment may include characters, partial characters, strikeouts, lines, scribbles, underlines, insertion carets, border shapes, and the like. Accordingly, all strokes within a document are automatically clustered into blocks as the user writes. The grouping may consider the physical proximity of the strokes, the time they were created, etc.

Using a pointing device such as a stylus or other touch device, a user may add a series of strokes to represent a word or some other electronic handwriting annotation to the document at a user-designated positon. The word or stroke may modify or add to existing electronic content. The system responds to the new handwriting interaction by generating all possible document interpretations of the interaction, and ranks the document interpretations. In this regard, when new segments of electronic handwriting are received, they are provided to a handwriting recognition module 141. The handwriting recognition module 141 analyzes each segment and generates a textual interpretation of the segment. In this regard, a textual interpretation may include or take into consideration segments that include characters, partial characters, strikeouts, lines, scribbles, underlines, insertion carets, border shapes, and the like. Often, the handwriting recognition module 141 generates multiple textual interpretations.

To generate the interpretations, a parser dynamically generates a tree of content actions for the newly received segment of electronic handwriting. Each lower node that branches from a higher level node in the tree is representative of one of a plurality of content actions that can be performed with respect to the existing electronic content to identify a portion of the existing electronic content for association with at least a portion of the new segment. For example, a content action may include identifying an existing paragraph or a line of existing text, to which the new segment may be assigned.

The identified portion of the existing electronic content may be delineated according to a number of nodes along a given branch. For example, a first node in a branch may identify a paragraph to which the newly received segment may be assigned, and a second node along the branch may then identify a line within the paragraph to which the received segment may be assigned. Accordingly, an algorithm automatically traverses the tree along respective paths from a root node of the tree to respective leaf nodes of the tree to identify candidate portions of the existing electronic content to provide to the handwriting recognition module 141 with the new segment. Each determined candidate portion is then provided with the newly received segment of electronic handwriting to the recognition to obtain the plurality of textual interpretations of the new segment.

The textual interpretations generated by the handwriting recognition module 141 may then be utilized by a handwriting synthesizer that, based on an analysis of existing electronic handwriting in the document, generates respective handwriting representations for each of the plurality of textual interpretations obtained from the handwriting recognition module 141. Each of these electronic handwriting representations may include one or more computer-replicated glyphs substantially in a handwriting style of the existing electronic content (e.g., replicating the textual interpretation(s)). These handwriting representations are then applied to the content of the existing document in a hidden background process and scored based on how each respective electronic handwriting representation would change the display of the existing electronic content when displayed substantially at the position within or adjacent to the existing electronic content that was designated by the user.

A score for a handwriting interpretation may be based on, for example, a comparison of the visualized document, including the original electronic handwriting as annotated by the user, with a visualization of the document after the interpreted handwriting representation has been applied to the document (e.g., inserted into the electronic content). The score may decrease, for example, if the addition of the interpreted handwriting representation causes additional lines in a paragraph or causes an additional paragraph to be added. The score may remain the same or increase if the boundaries of the paragraph or line into which the interpreted handwriting representation remain substantially the same.

The system then selects the best interpretation based on the ranking and updates the document accordingly. The existing electronic content is then modified to include the selected electronic handwriting representation located substantially at the user designated position, and displayed on the display device. Reflow of the document and updates to spacing occur in real time as the user is writing. Additionally or in the alternative, the user may delay updating of the document until editing is complete, and then manually cause the document to update by selection of an update control.

In some implementations, electronic handwriting representations may not be generated (or desired), and scoring may be undertaken based on the plurality of textual interpretations obtained from the handwriting recognition module 141. In this regard, the system may convert the electronic handwriting received from the user, convert the handwriting to electronic text, and dynamically insert the newly converted electronic text into the existing electronic content after the scored textual interpretation is selected.

Feedback Loop

After receiving a segment of electronic handwriting and updating the document as described above, the system begins to monitor for additional feedback from the user to determine whether the insertion of a selected electronic handwriting representation can be considered accepted or rejected by the user. Acceptance may be indicated by the user taking no further action with regard to the newly inserted handwriting representation. Rejection, however, may be indicated by a user modification of the representation or an undo action. If a rejection is determined, the system may select a second electronic handwriting representation corresponding to one of the textual interpretations previously provided by the handwriting recognition module 141. For example, the system may select the interpretation corresponding to the next highest score. In some implementations, the textual interpretations obtained from the handwriting recognition module 141 may be rescored based on user input associated with the indication that the selected electronic handwriting representation was rejected. For example, the user may only cross out part of the newly annotated handwriting segment, or add to it. The updated handwriting segment may then be passed back through the handwriting recognition module 141 (along with selected portions of the existing electronic content, as described above), and then new scores generated based on updated newly generated handwriting representations being inserted into the document.

If the system is unable to obtain a certain confidence level for new handwriting input, the system may visually solicit feedback from the user. After scoring a textual interpretation, the system may determine that the score does not satisfy a predetermined confidence level, and then visually identify a portion of the modified electronic content corresponding to the textual interpretation as not satisfying the predetermined confidence level. For example, a portion of the electronic handwriting representation applied to the document may be highlighted. Additionally or in the alternative, before the existing electronic content is modified, the system may visually identify a position within or adjacent to the existing electronic content where the handwriting representation will be placed, and then prompt for user acceptance or rejection of the designated location.

Additional Features

The system simultaneously maintains electronic content as electronic handwriting and a character-based textual representation of existing electronic content. When an electronic handwriting representation is added to the document, the character-based textual representation is also updated to include the corresponding textual interpretation. The system may also include an option to display electronic handwriting simultaneously with a character-based textual representation, such that each word of the character-based textual representation is provided for display adjacent to or directly underneath a corresponding displayed word segment of the electronic handwriting.

The foregoing features, which are described further below, provide the technical effect of enabling interaction between computer-based text and handwriting, all while maintaining a natural flow of a written document. In this regard, the subject technology enables a user to update a document simultaneously in both computer-generated text as well as electronic handwriting, without having to be concerned with the particular mode in which the document should be edited for an optimal result.

FIG. 1 illustrates an exemplary system 100 for editing electronic text, according to aspects of the subject technology. System 100 includes computing device 101, touch device 178, network 170, and application server 180. Computing device 101 and/or touch device 178 may be coupled to application server 180 over network 170.

Computing device 101 includes processor 121, one or more input/output components such as display device 122, communications module 123, and memory 130. Memory 130 includes touch-enabled editor application 140, which may include a handwriting recognition module 141 and a scoring module 142.

In aspects of the subject technology, computing device 101 is a touch-enabled device that may receive touch input from a finger or other instrument via display device 122. For example, computing device 101 may be a desktop all-in-one computer, tablet or convertible computer, laptop computer, smart phone, portable gaming console, or other device having a display device 122 supporting electronic pen input.

In one example, touch input is used to refer generally to input from a touch device 178, which may be implemented as a finger, or an electronic pen or a stylus that can interface with display device 122 of computing device 101. For example, touch device 178 may be an active device that includes processing circuitry, memory, and/or one or more applications stored in the pen device memory, or may be a passive device having a material composition configured to be detectable by circuitry within display device 122. For example, a passive pen device may interface with capacitive or resistive touchscreens, display digitizers, peripheral tablet devices, or other input devices coupled to or integrated with display device 122. In some aspects of the subject technology, display device 122 may correspond to a display projector or augmented reality eyewear, in which case touch device 178 be implemented as an air pen that provides pen input without contacting a physical surface.

A user desiring to hand write text with touch device 178 and computing device 101 may, for example, access an application storefront supported by application server 180 to download and install touch-enabled editor application 140 onto computing device 101. Thus, computing device 101 may utilize communications module 123, for example an Ethernet adapter, wireless card or cellular modem, to communicate with application server 180 over network 170. In aspects of the subject technology, touch-enabled editor application 140 may be provided on installable media, for example on an optical disc, flash memory card, or other device. In other aspects of the subject technology, touch-enabled editor application 140 may be preinstalled onto computing device 101, or touch-enabled editor application 140 may be integrated as part of an operating system of computing device 101.

Touch device 178 may interact with touch-enabled editor application 140 via display device 122 (e.g., by actively transmitting communications to electrodes or other receiving components in the display device, or by passively causing detectable changes such as capacitive or resistive changes in electrodes or other receiving components in the display device) and/or may interact with touch-enabled editor application 140 by receiving and transmitting signals via communications module 123.

Scoring module 142, may be included with touch-enabled editor application 140 or may be operably connected to application 140, for example, as a local plug-in or a web-application located at a server and accessible via a web-based API. Touch-enabled editor application 140 may provide a user with the ability to enter handwritten text and/or drawings along with an option to digitize and/or clean up the handwritten input after entry. Touch-enabled editor application 140 may also provide a user with other types of input options, such as options to input content from a keyboard and/or options for insertion of objects such as images, videos, or other figures, via a file browser or drag-and-drop operation.

One example function that may be performed by the computing device 101 is recognition of handwritten text that is input to the computing device 101. A user can input handwriting to the computing device 101 for recognition using touch device 178, including a finger or stylus, a mouse, a trackball, a pen, or the like.

Handwritten input generally includes one or more strokes, e.g., single points or continuous lines, which individually or collectively represent one or more characters in a writing system. A "stroke" can form a portion of a character, one or more full characters, a word or a portion of a word, a multi-word phrase, or even a complete sentence. A handwriting recognition module 141, such as handwriting recognition module 141, parses handwritten input into individual handwritten characters. The handwriting recognition module 141 determines text characters based on the handwritten characters, respectively. The determined text characters are displayed to the user. The recognition may be a single character at a time, multiple characters at a time, one or more words at a time, or the recognition of less than (a portion of) a single character. Thus, when the description herein discusses the recognition of handwritten input to determine a "character" it should be understood that the term "character" is intended to include a single character, multiple characters (including a word, multiple words, phrases, sentences, etc.) and a portion of a single character.

The handwritten input recognition can be performed locally (at the computing device 101 via display device 122), in the cloud (at a server connected to the computing device 101 via a network), or at a combination thereof. It should be appreciated that the techniques described herein as being performed at "a server" can be performed at more than one server in a distributed or parallel server arrangement. Thus, the term server as used herein is meant to include a single server and a plurality of servers working in conjunction.

In one or more implementations, while a handwritten input is being recognized, possible stems of a handwritten word represented by the handwritten input and possible whole words for one or more possible stems can be identified. The computing device 101 may display the possible stems to a user of the device. As will be described further, the recognition module 141 may automatically select one or more stems based on a scoring algorithm and wait for further input from the user to confirm or rejects the selection. In some implementations, the computing device 101 may display a possible word indicator with a possible stem when one or more possible whole words have been identified for the possible stem. The user can then select a possible stem that is displayed with a possible word indicator. When a possible stem is selected, the computing device 101 displays possible words identified for the possible stem. The user can select one of the possible words or one of the possible stems before the recognition of the handwritten input is complete.

If the user begins inputting another handwritten input while a handwritten input is being recognized, the computing device 101 may alter the size of the first handwritten input that is passed to the handwriting recognition module 141 and/or is currently being recognized, for example, when the handwritten input(s) have not yet been recognized. In some implementations, computing device 101 may also display a recognition pending indicator for the user when a handwritten input is currently being recognized and/or there are one or more additional handwritten inputs to be recognized.

Figure 2A:
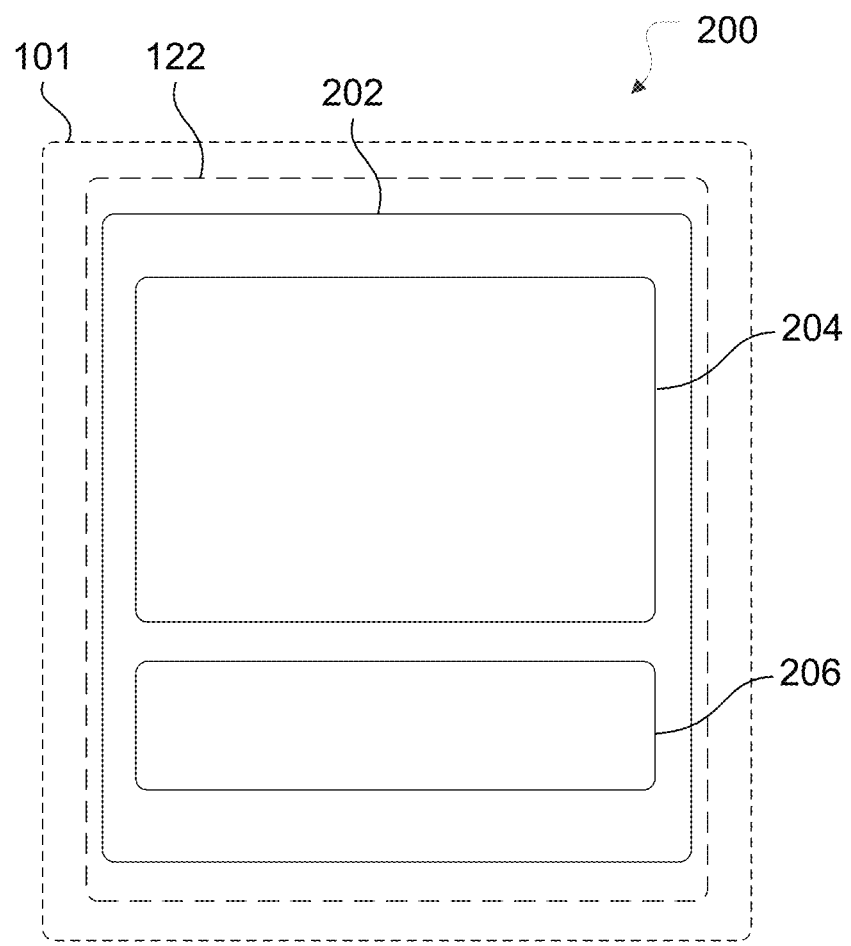
FIGS. 2A and 2B depict an example handwriting recognition interface displayed on the touch display, according to aspects of the subject technology.
Figure 2B:
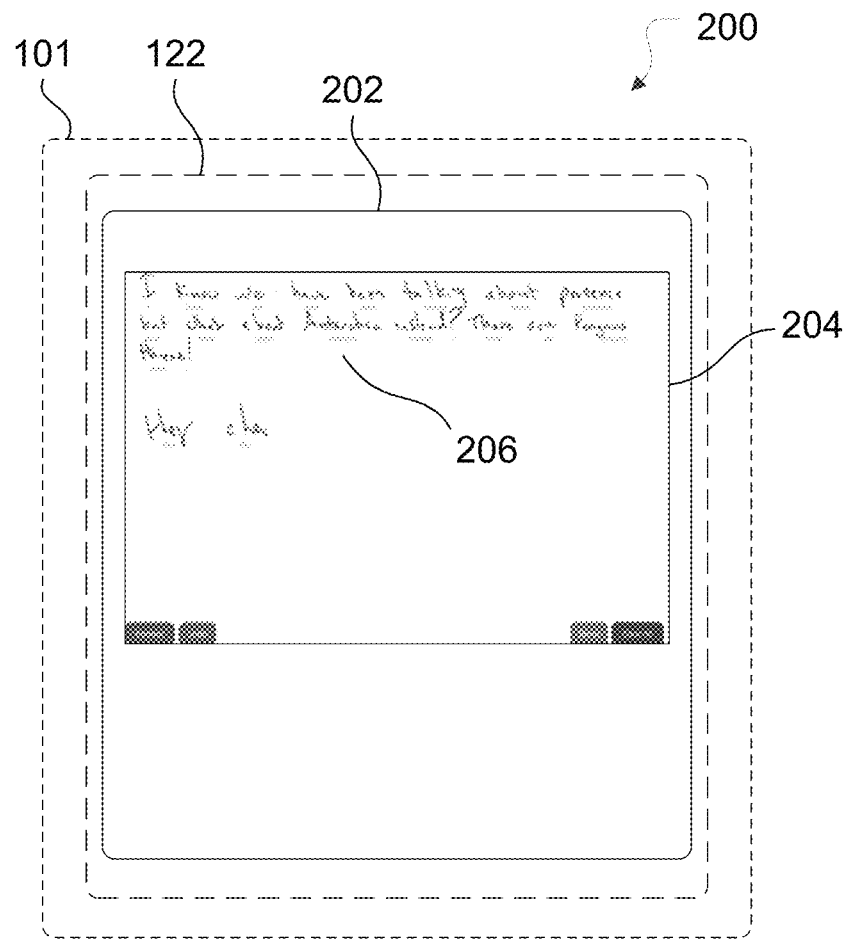

FIGS. 2A and 2B depict an example handwriting recognition interface displayed on the touch display 122, according to various implementations. Editor application 140 displays a handwriting interface 202 on the touch display 122 for the user to input handwriting to the computing device 101 for recognition. Handwriting interface 202 includes a handwriting display portion 204, the handwriting interface 200 may also include a whole or partial keyboard, such as a QWERTY based keyboard, a T9 based keyboard, or another suitable type of interface from which the user can input spaces, returns, punctuation marks, symbols, and the like. In one example, the handwriting recognition interface is displayed on the touch display without an interface from which the user 108 can input spaces, returns, punctuation marks, symbols, and the like.

As depicted in FIG. 2A, in some implementations, the computing device 101 may generate two display portions on the touch display 122: a first display portion 204 and optionally a second display portion 206. In the first display portion, the computing device 101 displays a handwritten input that is currently being recognized and any additional handwritten inputs that have not yet been recognized. In the second display portion, the computing device 101 may display text corresponding to handwritten words and/or handwritten characters that have previously been recognized. In this regard, a character-based textual representation of the existing electronic content displayed on a display device is maintained in memory 130 and updated with a textual interpretations of handwriting representations selected by editor application 140. The character-based textual representation may be displayed in second display portion 206, or hidden from view.

The user may input handwriting for recognition anywhere within handwriting display portion 204 or, in some embodiments, anywhere upon the touch display 122. The editor application 140 may display the handwriting input as it is input by the user in real time, during recognition of handwriting, or both. It should be understood that real time may include an acceptable amount of delay between input and display. The display of the text characters as the handwriting input is recognized may provide a visual indication of the progress of the recognition to the user.

Once the user provides a handwritten input, the user handwriting interface 200 may display the handwritten input within the handwriting display portion 204. The user can provide handwritten input using cursive or print (also referred to as block letter). While handwriting in the English language is discussed and shown, the recognition and display techniques disclosed herein are also applicable to handwritten input in other languages.

In some implementations, the updated character-based textual representation may be provided for display with the modified version of the existing electronic content on the display device in a space adjacent and/or below the inputted handwriting. As depicted in FIG. 2B, the updated character-based textual representation including a plurality of words, each word may be provided for display adjacent to or directly underneath a corresponding displayed word segment of the modified version of the existing electronic content. As new strokes are recognized the corresponding character-based textual representation is displayed below the handwritten characters as they are input and updated in real time.

With further reference to FIG. 1, handwriting recognition module 141 may parse handwritten input into handwritten characters using data stored in a recognition datastore 150. The editor application 140 may update what is displayed to display a representation of the handwritten input using the one or more handwritten characters.

Based on data stored in the recognition datastore 150, the handwriting recognition module 141 can recognize the handwritten characters of the handwritten input one by one. In other words, the handwriting recognition module 141 may determine text characters for the handwritten characters one handwritten character at a time. In some implementations, the handwriting recognition module 141 may recognize multiple handwritten characters of a handwritten input at a time. The order that the handwriting recognition module 141 recognizes the handwritten characters may be a logical order of reading, such as left to right for recognition of English language.

The handwriting recognition module 141 may parse the handwritten input into various portions, such as one or more handwritten characters. For example, the handwriting recognition module 141 can parse the handwritten input "hello" into four handwritten characters that form the handwritten input. In various languages, a character may correspond to a word.

Figures 3, 4:
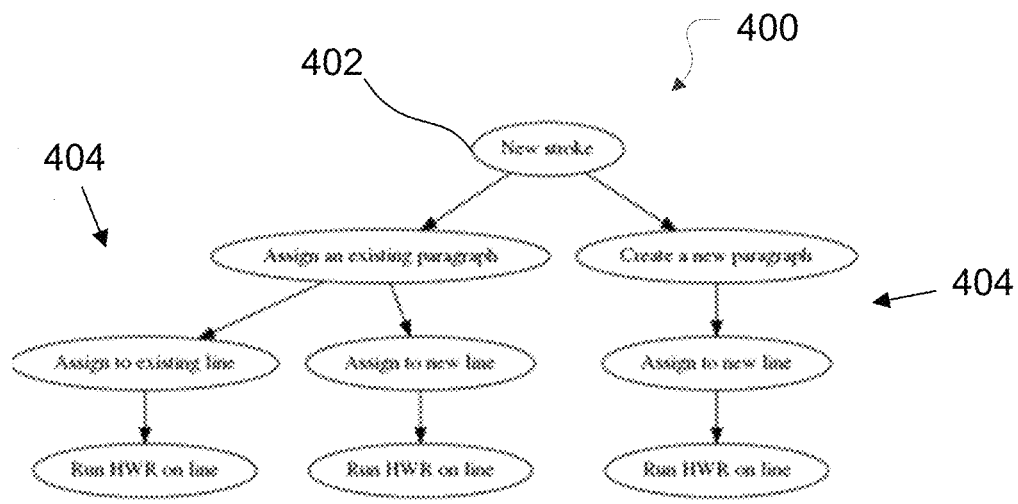
FIG. 3 is an example reflow of characters input into a display, according to aspects of the subject technology.
FIG. 4 depicts an example tree of content actions for recognizing electronic handwriting, according to aspects of the subject technology.

FIG. 3 is an example reflow of characters input into display 122, according to one or more implementations of the subject technology. Editor application 140 displays the text characters within the text display portion 204 as they are determined, reflowing existing content to incorporate new strokes and newly generated handwritten content. In the depicted example, the user inputs the characters "butnot" via touch display 122. The characters are passed to handwriting recognition module 141, which parses the handwritten input into various portions. Here, handwriting recognition module 141 determines that the inputted characters include two words "but" and "not" and return two different versions of the phrase with different space inserted between the words. Each of the versions in analyzed together with existing electronic content displayed in handwriting interface 202 and scored.

With reference to FIG. 1, the recognition of handwriting input may be performed wholly or in part by a remote server 180. The editor application 140 may capture a digital representation of a handwritten input that is input to the touch display 122. The communication module 123 may transmit the digital representation to the server 180 via a network 170. The network 170 may be, for example, a cellular network, a satellite network, or another suitable type of network. The server 180 may include a communication module, a handwriting recognition module 141, and a recognition datastore 150. It should be appreciated that the server 500 may include additional computing components such as one or more processors, memory, a power supply, and other suitable computing components.

The server 180 may receive the digital representation via the communication module 123. The recognition module 141 may parse the digital representation into handwritten characters. The recognition module 141 may parse the handwritten input into handwritten characters, for example, using data stored in the recognition datastore 150. The server 180 may transmit one or more representations of the handwritten characters back to computing device 101 for computing device 101 to display the handwritten characters to a user (e.g., on display device 122).

The recognition module 141 may determine the text characters for the handwritten characters one by one or more than one at a time. For example, the recognition module 141 may determine the text characters for the handwritten characters using data stored in the recognition datastore 512. The server 180 can transmit indicators of the text characters for the handwritten characters to the computing device 101 as the text characters are determined. The computing device 101 determines the text characters based on the indicators and displays the text characters to the user via the touch display 122.

The digital representation that the editor application 140 captures is embodied in a request context that is sent to recognition engine 142. In this regard, the request context may include electronic handwriting strokes currently inputted into the editor application 140 via the handwriting interface 202, as well as a set of already recognized characters before the strokes. The request context may also include a set of previously recognized characters after the strokes. For example, the editor application may detect that the user is attempting to insert characters between words or other characters.

FIG. 4 depicts an example tree of content actions for recognizing electronic handwriting, according to one or more implementations of the subject technology. Recognition engine 142 includes a parser that generates a tree of content actions 400 for the current request context. Tree may be implemented as a data structure resident within memory 130. A parent node 402 is generated for one or more strokes. As described previously, each lower node 404 that branches from a higher level node in the tree is representative of one of a plurality of content actions that can be performed with respect to the existing electronic content to identify a portion of the existing electronic content for association with at least a portion of the new segment. For example, a content action may include identifying an existing paragraph or a line of existing text, to which the new segment may be assigned. Each line, paragraph, word, or character may be selected using a nearest neighbor algorithm and/or search based on the inputted stroke(s).

The identified portion of the existing electronic content may be delineated according to a number of nodes along a given branch. In the depicted example, a first node in a branch identifies an existing paragraph to which the newly received segment may be assigned, and a second node along the branch (e.g., child of the first node) identifies a line within the paragraph to which the received segment may be assigned. A third node (child of the parent) identifies that the new stroke(s) likely belong to a new paragraph, and assign a new line to the stroke(s). Accordingly, an algorithm automatically traverses the tree along respective paths from a root node of the tree to respective leaf nodes of the tree to identify candidate portions of the existing electronic content to provide to the handwriting recognition module 141 with the new segment. Each determined candidate portion is then provided with the newly received segment of electronic handwriting to the recognition to obtain the plurality of textual interpretations of the new segment. In one or more implementations, handwriting recognition module 141 may generate the tree and perform this task.

Figure 5:
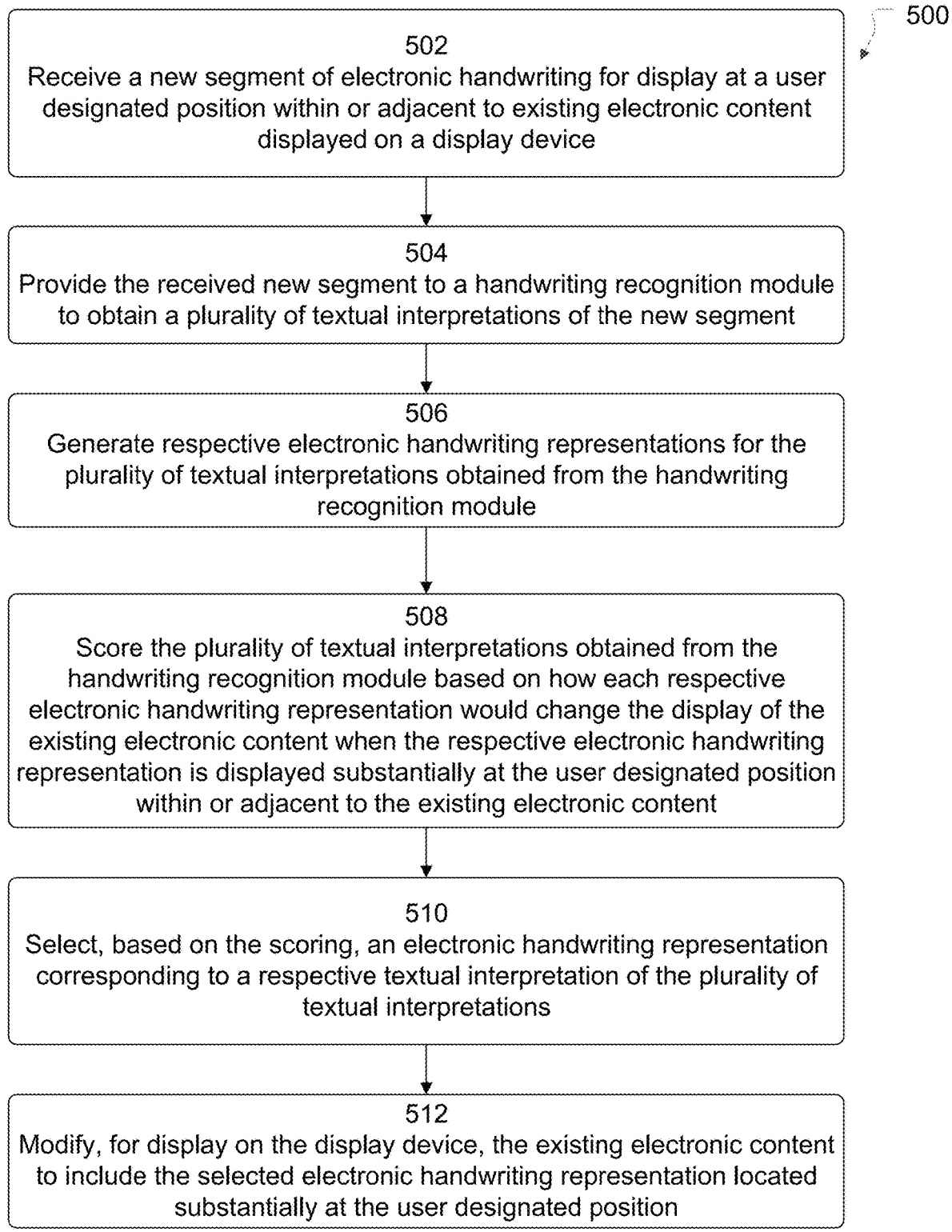
FIG. 5 depicts an example process for editing electronic handwriting, according to aspects of the subject technology.

FIG. 5 depicts an example process for editing electronic handwriting, according to aspects of the subject technology. For explanatory purposes, the various blocks of example process 500 are described herein with reference to FIGS. 1-4, and the components and/or processes described herein. The one or more of the blocks of process 500 may be implemented, for example, by computing device 101, including a processor and other components utilized by device 101. In some implementations, one or more of the blocks may be implemented apart from other blocks, and by one or more different processors or devices. Further for explanatory purposes, the blocks of example process 500 are described as occurring in serial, or linearly. However, multiple blocks of example process 500 may occur in parallel. In addition, the blocks of example process 500 need not be performed in the order shown and/or one or more of the blocks of example process 500 need not be performed.

In the depicted example flow diagram, a new segment of electronic handwriting is received by editor application 140 for display at a user designated position within or adjacent to existing electronic content displayed on display device 122 (502). For example, a user may electronically draw one or more strokes within handwriting display portion 204 of handwriting interface 200.

In response, editor application 140 provides the received new segment to handwriting recognition module 141 to obtain a plurality of textual interpretations of the new segment (504). Handwriting recognition module 141 generates the textual interpretations and passes them back to editor application 140.

Prior to passing the received new segment to handwriting recognition module 141, editor application 140 may generate a tree of content actions for the new segment. As described previously, a root node may first be created for the new segment, and each lower node that branches from a higher level node (e.g., starting at the root node) may be representative of one of a plurality of content actions that can be performed with respect to the existing electronic content to identify a portion of the existing electronic content for association with at least a portion of the new segment. Using this mechanism, editor application 140 may determine, automatically, without user intervention, candidate portions of the existing electronic content to provide to the handwriting recognition module 141 with the new segment. The candidate portions are generated based on automatically traversing the tree along respective paths from a root node of the tree to respective leaf nodes of the tree and identifying the portions of the existing electronic content associated with the content actions represented by nodes along the path. The new segment is then provided with each determined candidate portion of the existing electronic content to the handwriting recognition module to obtain the plurality of textual interpretations of the new segment.

It is notable that, in some examples, the new segment of electronic handwriting received at display 122 may modify an existing segment of electronic handwriting of the existing electronic content. In this case, the existing segment of electronic handwriting may be provided with the new segment to the handwriting recognition module to obtain the plurality of textual interpretations.

Editor application 140 then generates respective electronic handwriting representations for the plurality of textual interpretations obtained from the handwriting recognition module 141 (506). The electronic handwriting representations may be generated using handwriting synthesis, such that the electronic handwriting representations include one or more computer-replicated glyphs substantially in a handwriting style of the existing electronic content. The artificial handwriting generated by editor application 140 may be based on the user's own handwriting samples already input into editor application 140. Editor application 140 may match the style, font size, and stroke characteristics of the user. In some implementations, the generation of electronic handwriting representations by editor application 140 includes editor application 140 forwarding the textual interpretations to a handwriting synthesis engine (not shown).

The generated handwriting representations may not be (e.g., immediately) displayed to the user. In one or more implementations, editor application 140 passes the handwriting representations, along with at least a portion of the existing electronic content, to scoring module 142. Editor application 140, in connection with scoring module 142, assigns scores to the textual interpretations obtained from handwriting recognition module 141. Each textual interpretation obtained from the handwriting recognition module 141 is scored based on how its corresponding electronic handwriting representation would change the display of the existing electronic content when the electronic handwriting representation is displayed substantially at the user designated position within or adjacent to the existing electronic content (508). In this regard, the scoring module 142 may, without display, analyze the existing content with a selected handwriting representation inserted to determine how the existing content changes with the insertion. A score is calculated based on predetermined factors such as changes to: word spacing, baseline alignment, character kerning, character morphing, number of lines on a current page, word or line or paragraph reflow, and the like. For example, an increase or reduction in word spacing or kerning may negatively impact the score proportional to the increase or reduction amount. Scores may be represented as a value having a range, for example, from 0 to 1, or from −1 to 1 with 0 being a neutral or status quo value.

Editor application 140 then selects, based on the scoring, an electronic handwriting representation corresponding to a respective textual interpretation of the plurality of textual interpretations (510). Editor application 140 modifies, for display on display device 122, the existing electronic content to include the selected electronic handwriting representation located substantially at the user designated position (512). In this regard, the existing electronic content is modified to accommodate the selected electronic handwriting representation by way of a dynamic reflow of at least a portion of the existing electronic content.

In some implementations, editor application 140 displays one or more visual indicators of the progress of the recognition of the handwritten input. For example, computing device 101 may receive a handwriting (or character) representation corresponding to a first handwritten input, and display the handwriting (or character) representation in addition to updating the one or more visual indicators of the progress. Editor application 140 may receive a handwriting (or character) representation corresponding to the second handwritten input. Editor application 140 displays the handwriting (or character) representation corresponding to the second handwritten input and updates visual indicator(s) of the progress of the recognition. Editor application 140 may continue to receive handwriting (or character) representation, if any, (e.g., from handwriting recognition module 141 or server 180) display the determined text characters, and update visual indicator(s) displayed as they are received. Once all of the handwritten characters have been recognized, editor application 140 may receive an indicator from recognition module 141 (or server 180) that the recognition of the handwritten input is complete.

In some implementations, a visual indicator is elevated to a different color or otherwise highlighted to signal that the predetermined confidence level (e.g., a threshold score) was not met. A score assigned to a selected handwriting representation may be determined to have not met a predetermined confidence level (e.g., if only one representation was returned). Editor application 140 may then visually identify the portion of the modified electronic content corresponding to the selected electronic handwriting representation as not satisfying the predetermined confidence level.

In one or more implementations, editor application 140 incorporates a feedback loop that adjusts scoring and selection of handwriting representations based on input (or lack of input) from the user. Editor application 140 may visually designate, before modifying the existing electronic content, a computer designated position within or adjacent to the existing electronic content corresponding to an insertion point of the selected electronic handwriting. Editor application 140 monitors for an indication of user acceptance or rejection of the selected electronic handwriting representation. On receiving an indication of user rejection of the selected electronic handwriting representation, editor application 140 selects, as the selected electronic handwriting representation, a second electronic handwriting representation corresponding to a second textural interpretation of the plurality of textual interpretations. If the representation being rejected was the highest scored representation of representations that were assigned scores based on data from scoring module 142 then editor application 140 may select the representation having the next highest score. In some implementations, editor application 140 may rescore the representations as described above based on a new set of factors and select the highest representation. On an indication of rejection by the user, the current representation is replaced with the new representation. Editor application 140 may consider the absence of an indication of rejection as acceptance of the representation, for example, after a predetermined period of time (e.g., 1 or 2*s*).

For example, an indication that the selected electronic handwriting representation was rejected by a user may be received. In response, editor application 140 may select, a second electronic handwriting representation corresponding to a second textural interpretation of the plurality of textual interpretations, and modify, for display on the display device, the existing electronic content to include the second electronic handwriting representation located substantially at the user designated position. Before selection of the second representation, editor application 140 may rescore the textual interpretations obtained using the handwriting recognition module 141 based on user input associated with the indication that the selected electronic handwriting representation was rejected and based on how each respective electronic handwriting representation would change the display of the existing electronic content when the respective electronic handwriting representation is displayed substantially at the user designated position within or adjacent to the existing electronic content. The second electronic handwriting representation may then be selected based on the rescoring.

Many of the above-described example 500, and related features and applications, may also be implemented as software processes that are specified as a set of instructions recorded on a computer readable storage medium (also referred to as computer readable medium), and may be executed automatically (e.g., without user intervention). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

The term "software" is meant to include, where appropriate, firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 6:
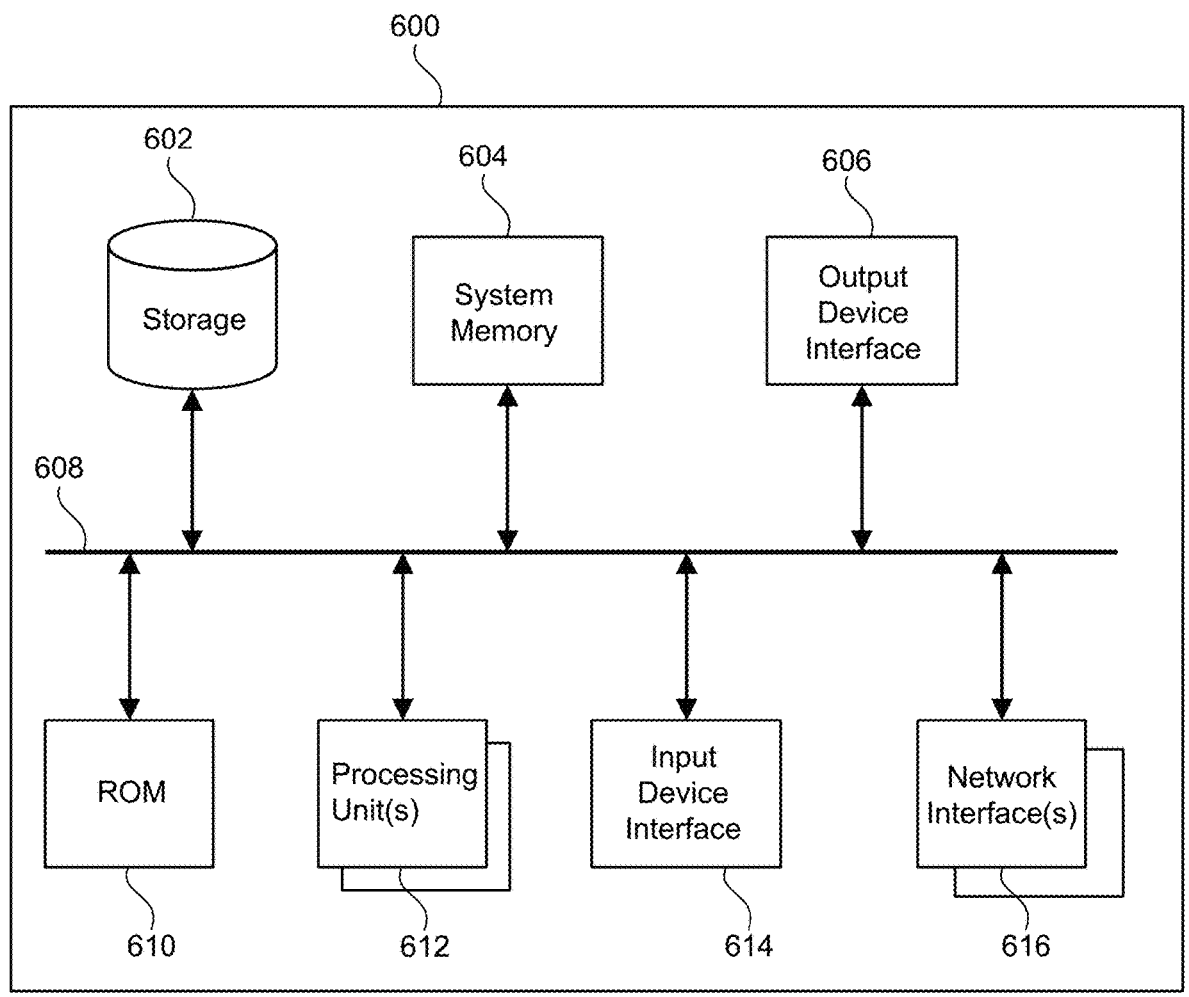
FIG. 6 is a conceptual diagram illustrating an example electronic system 600 for the recognition and editing of electronic handwriting, according to aspects of the subject technology.

FIG. 6 is a conceptual diagram illustrating an example electronic system 600 for the recognition and editing of electronic handwriting, according to aspects of the subject technology. Electronic system 600 may be a computing device for execution of software associated with one or more portions or steps of process 500, or components and processes provided by FIGS. 1-4. Electronic system 600 may be representative, in combination with the disclosure regarding FIGS. 1-5, of computing device 101. In this regard, electronic system 600 or computing device 101 may be a personal computer or a mobile device such as a smartphone, tablet computer, laptop, PDA, an augmented reality device, a wearable such as a watch or band or glasses, or combination thereof, or other touch screen or television with one or more processors embedded therein or coupled thereto, or any other sort of computer-related electronic device having network connectivity.

Electronic system 600 may include various types of computer readable media and interfaces for various other types of computer readable media. In the depicted example, electronic system 600 includes a bus 608, processing unit(s) 612, a system memory 604, a read-only memory (ROM) 610, a permanent storage device 602, an input device interface 614, an output device interface 606, and one or more network interfaces 616. In some implementations, electronic system 600 may include or be integrated with other computing devices or circuitry for operation of the various components and processes previously described.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such a random access memory. System memory 604 stores some of the instructions and data that the processor needs at runtime. In some implementations, the processes of the subject disclosure are stored in system memory 604, permanent storage device 602, and/or ROM 610. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, e.g., alphanumeric keyboards and pointing devices (also called "cursor control devices"). Output device interfaces 606 enables, e.g., the display of images generated by the electronic system 600. Output devices used with output device interface 606 include, e.g., printers and display devices, such as cathode ray tubes (CRT) or liquid crystal displays (LCD). Some implementations include devices such as a touchscreen that functions as both input and output devices.

Also, as shown in FIG. 6, bus 608 also couples electronic system 600 to a network (not shown) through network interfaces 616. Network interfaces 616 may include, e.g., a wireless access point (e.g., Bluetooth or WiFi) or radio circuitry for connecting to a wireless access point. Network interfaces 616 may also include hardware (e.g., Ethernet hardware) for connecting the computer to a part of a network of computers such as a local area network ("LAN"), a wide area network ("WAN"), wireless LAN, or an Intranet, or a network of networks, such as the Internet. Any or all components of electronic system 600 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The term website, as used herein, may include any aspect of a website, including one or more web pages, one or more servers used to host or store web related content, etc. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method comprising:
   determining, by a computing system and based on a segment of electronic handwriting, a plurality of candidate content segments;
   generating, by the computing system and based on the plurality of candidate content segments, a respective electronic handwriting representation for each candidate content segment from the plurality of candidate content segments;
   determining, by the computing system, a respective score for each of the plurality of candidate content segments based on a change in a display of existing electronic content if the respective electronic handwriting representation is displayed in place of the segment of the electronic handwriting;
   selecting, by the computing system and based on the respective scores, one of the plurality of candidate content segments as a selected electronic handwriting representation; and
   outputting, for display on a display device, the selected electronic handwriting representation.

2. The method of claim 1, wherein the electronic handwriting representations includes one or more computer-replicated glyphs substantially in a handwriting style of the existing electronic content, the method further comprising:
   dynamically reflowing at least a portion of the existing electronic content to accommodate the selected electronic handwriting representation.

3. The method of claim 1, further comprising:
   determining, by the computing system, that a score associated with the selected electronic handwriting representation does not satisfy a predetermined confidence level; and
   outputting, for display on the display device, a visual indication that the selected electronic handwriting representation does not satisfy the predetermined confidence level.

4. The method of claim 3, further comprising:
   before outputting the selected electronic handwriting representation, outputting, for display on the display device, a visual indication of a computer designated position within or adjacent to the existing electronic content corresponding to an insertion point of the selected electronic handwriting representation;
   receiving, by the computing system, a user input indicating user acceptance or rejection of the selected electronic handwriting representation; and
   responsive to receiving an indication of user rejection of the selected electronic handwriting representation, selecting, by the computing system, a different one of the plurality of candidate content segments as an updated selected electronic handwriting representation.

5. The method of claim 1, further comprising:
   maintaining, in a memory of the computing system, a character-based textual representation of the existing electronic content displayed on the display device; and
   storing, in the memory of the computing system, an updated character-based textual representation that includes a textual interpretation of the selected electronic handwriting representation.

6. The method of claim 5, further comprising:
outputting, for display on the display device, the updated character-based textual representation, the updated character-based textual representation including a plurality of words, each word from the plurality of words being positioned adjacent to or directly underneath a corresponding word segment of the existing electronic content.

7. The method of claim 1, further comprising:
receiving, by the computing system, an indication that the selected electronic handwriting representation was rejected by a user;
selecting, by the computing system, a different one of the plurality of candidate content segments as an updated selected electronic handwriting representation; and
outputting, for display on the display device, updated electronic content that includes the updated selected electronic handwriting representation substantially at a user designated position.

8. The method of claim 7, further comprising:
determining, by the computing system, a respective updated score for each of the plurality of candidate content segments based on user input associated with the indication that the selected electronic handwriting representation was rejected and based on how each respective electronic handwriting representation would change the display of the existing electronic content when the respective electronic handwriting representation is displayed substantially at the user designated position within or adjacent to the existing electronic content; and
selecting, by the computing system and based on the respective updated scores, a different one of the plurality of candidate content segments as an updated selected electronic handwriting representation.

9. The method of claim 1, wherein the segment of electronic handwriting modifies an existing segment of electronic handwriting of the existing electronic content, and wherein the existing segment of electronic handwriting is provided with the segment to a handwriting recognition module to obtain the plurality of candidate content segments.

10. The method of claim 1, further comprising:
generating a tree of content actions for the segment of electronic handwriting, each lower node that branches from a higher level node in the tree being representative of one of a plurality of content actions that can be performed with respect to the existing electronic content to identify a portion of the existing electronic content for association with at least a portion of the segment of electronic handwriting, the identified portion of the existing electronic content being delineated according to a number of nodes along a given branch,
determining, automatically and without user intervention, candidate portions of the existing electronic content to provide to a handwriting recognition module with the segment of electronic handwriting based on automatically traversing the tree along respective paths from a root node of the tree to respective leaf nodes of the tree and identifying the portions of the existing electronic content associated with the content actions represented by nodes along the path; and
providing the segment of electronic handwriting with each determined candidate portion of the existing electronic content to the handwriting recognition module to obtain the plurality of textual interpretations of the segment of electronic handwriting.

11. A system comprising:
one or more processors;
a touch-sensitive display device; and
a memory storage device storing instructions that, when executed by the one or more processors, cause the one or more processors to:
determine, based on a segment of electronic handwriting, a plurality of candidate content segments;
generate, based on the plurality of candidate content segments, a respective electronic handwriting representation for each candidate content segment from the plurality of candidate content segments;
determine a respective score for each of the plurality of candidate content segments based on a change in a display of existing electronic content if the respective electronic handwriting representation is displayed in place of the segment of the electronic handwriting;
select, based on the respective scores, one of the candidate content segments as a selected electronic handwriting representation; and
output, for display by the touch-sensitive display device, the selected electronic handwriting representation.

12. The system of claim 11, wherein the instructions further cause the one or more processors to:
determine that a score associated with the selected electronic handwriting representation does not satisfy a predetermined confidence level; and
output, for display by the touch-sensitive display device, a visual indication that the selected electronic handwriting representation does not satisfy the predetermined confidence level.

13. The system of claim 12, wherein the instructions further cause the one or more processors to:
before outputting the selected electronic handwriting representation, output, for display by the touch-sensitive display device, a visual indication of a computer designated position within or adjacent to the existing electronic content corresponding to an insertion point of the selected electronic handwriting representation; and
responsive to receiving an indication of a user input rejecting the selected electronic handwriting representation, select a different one of the plurality of candidate content segments as an updated selected electronic handwriting representation.

14. The system of claim 11, wherein the instructions further cause the one or more processors to:
maintain, in the memory storage device, a character-based textual representation of the existing electronic content displayed on the display device;
store, in the memory storage device, an updated character-based textual representation that includes a textual interpretation of the selected electronic handwriting representation; and
output, for display by the touch-sensitive display device, the updated character-based textual representation, the updated character-based textual representation including a plurality of words, each word from the plurality of words being positioned adjacent to or directly underneath a corresponding word segment of the existing electronic content.

15. The system of claim 11, wherein the instructions further cause the one or more processors to:
receive an indication that the selected electronic handwriting representation was rejected by a user;

determine a respective updated score for each of the plurality of candidate content segments based on user input associated with the indication that the selected electronic handwriting representation was rejected and based on how each respective electronic handwriting representation would change the display of the existing electronic content when the respective electronic handwriting representation is displayed substantially at a user designated position within or adjacent to the existing electronic content;

select, based on the respective updated scores, a different one of the plurality of candidate content segments as an updated selected electronic handwriting representation; and output, for display by the touch-sensitive display device, updated electronic content that includes the updated selected electronic handwriting representation substantially at a user designated position.

16. A non-transitory computer-readable medium having instructions stored thereon that, when executed by one or more processors of a computing device, cause the one or more processors to:

determine, based on a segment of electronic handwriting, a plurality of candidate content segments;

generate, based on the plurality of candidate content segments, a respective electronic handwriting representation for each candidate content segment from the plurality of candidate content segments;

determine a respective score for each of the plurality of candidate content segments based on a change in a display of existing electronic content if the respective electronic handwriting representation is displayed in place of the segment of the electronic handwriting;

select, based on the respective scores, one of the candidate content segments as a selected electronic handwriting representation; and output, for display by a display device, the selected electronic handwriting representation.

17. The non-transitory computer-readable medium of claim 16, wherein the instructions further cause the one or more processors to:

determine that a score associated with the selected electronic handwriting representation does not satisfy a predetermined confidence level; and output, for display by the display device, a visual indication that the selected electronic handwriting representation does not satisfy the predetermined confidence level.

18. The non-transitory computer-readable medium of claim 17, wherein the instructions further cause the one or more processors to:

before outputting the selected electronic handwriting representation, output, for display by the display device, a visual indication of a computer designated position within or adjacent to the existing electronic content corresponding to an insertion point of the selected electronic handwriting representation; and responsive to receiving an indication of a user input rejecting the selected electronic handwriting representation, select a different one of the plurality of candidate content segments as an updated selected electronic handwriting representation.

19. The non-transitory computer-readable medium of claim 16, wherein the instructions further cause the one or more processors to:

maintain, in a memory, a character-based textual representation of the existing electronic content displayed on the display device;

store, in the memory, an updated character-based textual representation that includes a textual interpretation of the selected electronic handwriting representation; and output, for display by the display device, the updated character-based textual representation, the updated character-based textual representation including a plurality of words, each word from the plurality of words being positioned adjacent to or directly underneath a corresponding word segment of the existing electronic content.

20. The non-transitory computer-readable medium of claim 16, wherein the instructions further cause the one or more processors to:

receive an indication that the selected electronic handwriting representation was rejected by a user;

determine a respective updated score for each of the plurality of candidate content segments based on user input associated with the indication that the selected electronic handwriting representation was rejected and based on how each respective electronic handwriting representation would change the display of the existing electronic content when the respective electronic handwriting representation is displayed substantially at a user designated position within or adjacent to the existing electronic content;

select, based on the respective updated scores, a different one of the plurality of candidate content segments as an updated selected electronic handwriting representation; and output, for display by the display device, updated electronic content that includes the updated selected electronic handwriting representation substantially at a user designated position.

* * * * *